United States Patent [19]
Guay et al.

[11] Patent Number: 5,881,210
[45] Date of Patent: Mar. 9, 1999

[54] COLOR PRINTING SYSTEM AND METHOD WITH REDUCED BLEED

[75] Inventors: Randall G. Guay, Cupertino; James C. Zandee, Santa Clara, both of Calif.

[73] Assignee: Apple Computer, Inc., Cupertino, Calif.

[21] Appl. No.: 675,847

[22] Filed: Jul. 3, 1996

Related U.S. Application Data

[63] Continuation of Ser. No. 313,468, Sep. 27, 1994.

[51] Int. Cl.[6] .................................................. G06F 15/00
[52] U.S. Cl. ............................................................ 395/109
[58] Field of Search .................................... 395/101, 109, 395/110, 800; 345/126, 128, 131, 133; 358/512, 517, 518, 529, 532, 401, 461; 382/162, 163, 164, 165, 166, 167, 255, 263, 264, 266, 269

[56] References Cited

U.S. PATENT DOCUMENTS

| | | | |
|---|---|---|---|
| 5,287,199 | 2/1994 | Zoccolillo | 358/468 |
| 5,315,382 | 5/1994 | Tahioua | 358/529 |
| 5,329,385 | 7/1994 | Washio | 358/529 |
| 5,359,437 | 10/1994 | Hibi | 358/529 |
| 5,398,123 | 3/1995 | Katsuma | 358/518 |
| 5,428,377 | 6/1995 | Stottel et al. | 358/529 |

FOREIGN PATENT DOCUMENTS

| | | |
|---|---|---|
| 0580376A1 | 1/1994 | European Pat. Off. . |
| 880111643 | 11/1989 | Japan . |
| 910345050 | 9/1993 | Japan . |

*Primary Examiner*—David K. Moore
*Assistant Examiner*—Gabriel I. Garcia
*Attorney, Agent, or Firm*—Beyer & Weaver, LLP

[57] ABSTRACT

A color printing system with reduced bleed includes a computer and a color printer. The computer has a digital processor and memory accessed by the digital processor, where the memory stores printable objects selected from the group comprising graphic objects and non-graphic objects and pixel maps corresponding to the graphic objects and the non-graphic objects. The color printer is coupled to the computer and is capable of printing the pixel maps using color pixels and black pixels. An image processor implemented on the computer identifies the graphic objects among the printable objects, adjusts pixel densities of the graphic objects, and renders the printable objects as the pixel maps, such that black pixel densities of pixel maps of the graphic objects are reduced without reducing black pixel densities of pixel maps of the non-graphic objects. A method of the present invention includes the steps of identifying graphic objects among printable objects, adjusting color information of the graphic objects if bleed reduction criteria are met, and developing printer control information from the printable objects that can provide for a lower black pixel density for the graphic objects due to the adjustment of the color information of the graphic objects.

23 Claims, 7 Drawing Sheets

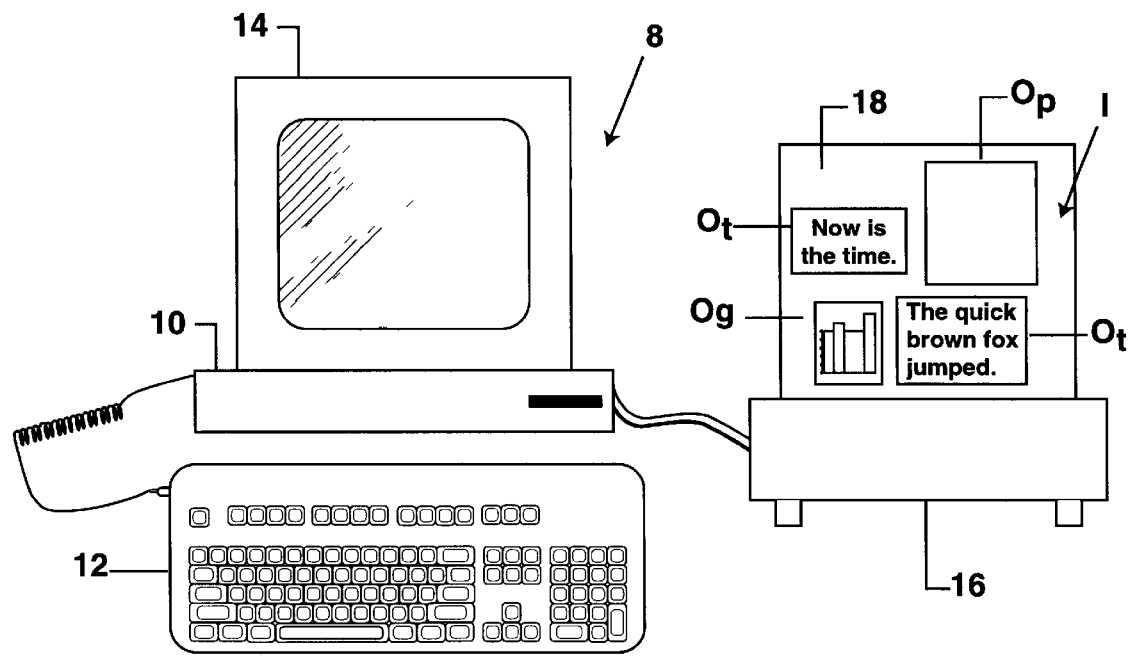
Fig. 1
(Prior Art)
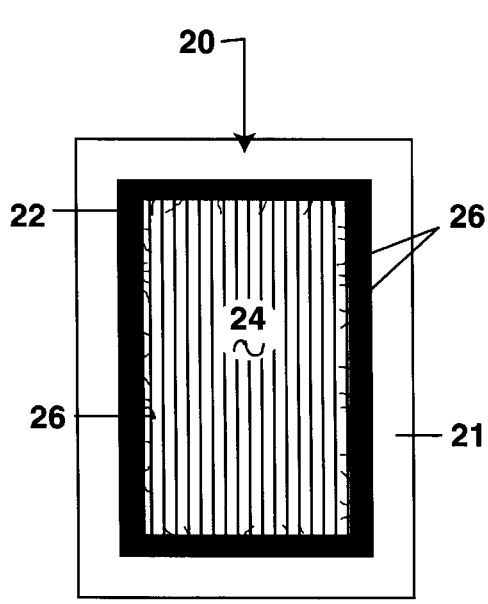
Fig. 2a
(Prior Art)
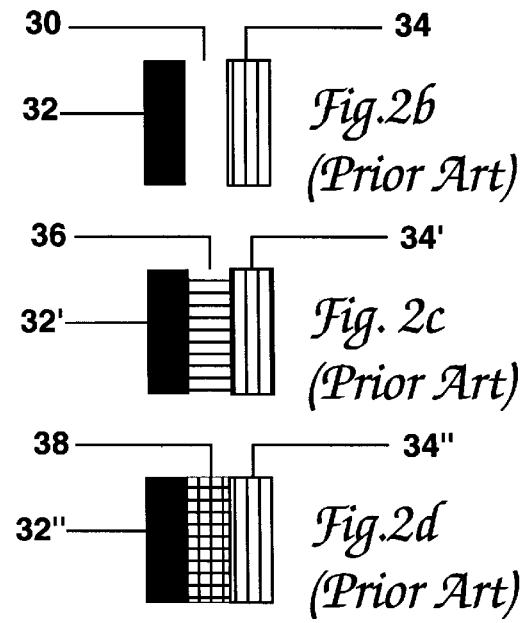
Fig. 2b
(Prior Art)
Fig. 2c
(Prior Art)
Fig. 2d
(Prior Art)

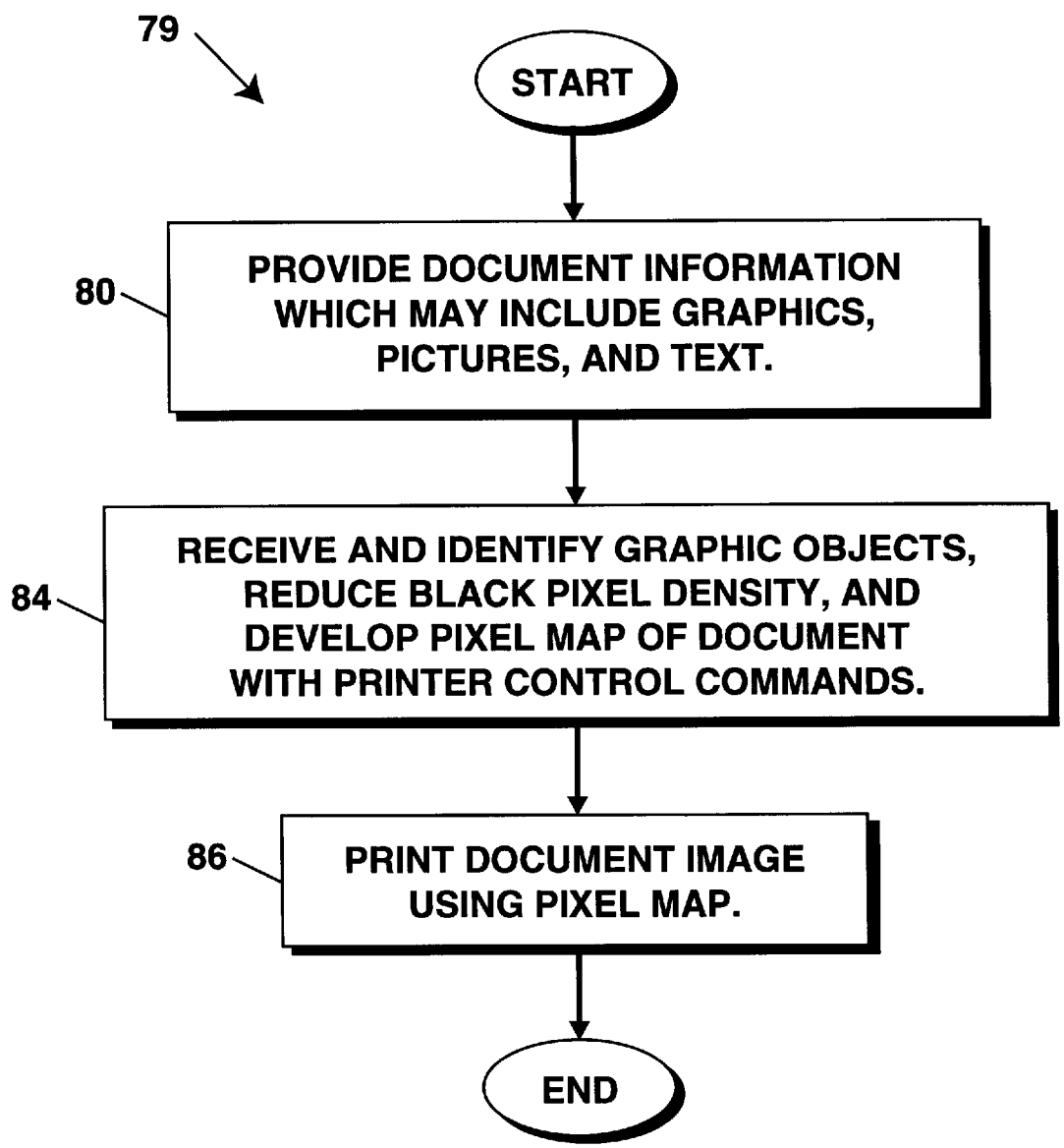

COLOR PRINTING SYSTEM AND METHOD WITH REDUCED BLEED

This is a continuation of application Ser. No. 08/313,468 filed Sep. 27, 1994.

BACKGROUND OF THE INVENTION

This invention relates generally to color printing systems and, more particularly, to color printing systems and methods which address the problem of the bleeding of black ink into adjacent color areas of a page.

The use of computers has proliferated to such an extent that computers are readily available to people from all walks of life. It is not uncommon to enter an office and see a personal computer system on virtually every desk. As illustrated in FIG. 1, the typical computer system 8 has a computer housing 10, a keyboard 12 for user interface with the computer, a color display 14, and (optionally) a printer 16. The printer 16 is sometimes shared with other computers over a local area network (LAN). The computer housing 10 typically contains a central processing unit (CPU), read only memory (ROM), random access memory (RAM), long term memory (such as a hard disk or a PCMCIA card), and other logic, peripherals, interfaces, and drivers well known to those skilled in the art of computer design.

The computer system can store image information in its permanent (e.g. hard disk) or temporary (e.g. RAM) memory. Logically, there is very little difference between permanent and temporary memory during the operation of the computer and, therefore, all forms of read/write memory accessible by the CPU of the computer will be collectively referred to herein as "memory." Since many color displays are RGB (red, green, blue) type monitors, image information is typically stored in memory in the form of an electronic document containing an RGB pixel map and corresponding information regarding the nature of "objects" in the document. As is well known to those skilled in the art, "objects" are collections of code and data which represent a logical entity, such as a text object, a graphic object, or a picture object. In the RGB model or "space", the three colors are additive such that the more of each color that is added, the closer the color in the image is to white. This corresponds to the way color displays work: saturating the red, green, and blue phosphors of a color display produces white, turning the three phosphors completely off produces black, and mixing the three colors produces other colors.

For cost and other reasons, the printer 16 is often a monochrome printer which is capable of printing in only one color. Since the "color" is usually black and since most paper is white, monochrome printers are often called "black-and-white" printers. The computer provides the printer with image information to cause the printer to print an image on a printed paper 18. This image can be represented in the electronic document by objects corresponding to the graphic object OG, the text objects OT, and the picture object OP printed on the page.

Color printers are also available, although at a higher cost (and sometimes lower resolution) than monochrome printers using the same technology. Most color printers are "CMYK" type printers which use utilize cyan (C), magenta (M), yellow (Y), and black (K) to produce color images. In other words, most color printers use a CMYK model and therefore operate in CMYK "space." With CMYK printers, the colors CMY are subtractive. That is, the more of cyan, magenta, or yellow added, the closer the color in the image is to black. With CMYK printers, black can be theoretically achieved by mixing full density cyan, magenta, and yellow. However, the C, M, and Y inks that are used cannot produce a truly dark, dense black, so a separate black ink is also provided. Since the display operates on in RGB space, the computer converts the RGB pixel map of the electronic document into a CMYK pixel map to create a printed image. However, in the prior art, when the CMYK pixel map is created from the RGB pixel map, the information regarding the nature of objects in the image is not maintained. Therefore, it is not possible to distinguish various objects in a CMYK encoded image.

Due to material limitations, it is difficult to create a black ink which both has the desired printing qualities (darkness, drying time, viscosity, etc.) and yet does not migrate or "wick" into adjacent areas on a page. As illustrated in FIG. 2a, a color image 20 on a page 21 may include a black area 22 and a color area 24. The ink of black area 22 wicks along the fiber in the paper and creates a number of "bleed lines" 26, which are often quite visible in the lighter color area 24 portion of the printout 20. The result of this effect is referred to as "bleed." Excessive bleeding will degrade the image 20.

Since the amount of bleed is directly related to the capillary action or "wicking" of the fibers in the paper, a partial solution to this problem is to use a coated paper to reduce wicking. However, this solution requires the purchase and storage of expensive and sometimes scarce coated paper, as opposed to relatively cheap and readily available standard papers. Furthermore, since different printers may have different ink chemistries, it is often necessary to buy coated paper that is specifically made for that printer. This, of course, again tends to increase cost and reduce availability.

One attempt to avoid bleed without using a special, coated paper is illustrated in FIG. 2b. In this solution the computer system 8 analyzes the CMYK pixel map and alters it by placing a band of white pixels 30 (i.e. where no color is present) between black pixels 32 and the color pixels 34. This reduces the amount of black that bleeds into an adjacent color by providing a buffer zone between the two areas. However, this solution creates a white "halo" surrounding the color areas, which noticeably degrades the quality of the image.

Another attempted solution is illustrated in FIG. 2c. Here the computer system analyzes the CMYK pixel map and alters it by placing a mixed cyan, magenta, and yellow band of pixels 36 at the intersection of black pixels 32' and other color pixels 34'. This reduces black bleed but has the image corrupting side-effect of visibly distorting the color of the perimeter of the color area.

FIG. 2d illustrates yet another partial solution to the bleeding problem. In this solution, the computer system analyzes the CMYK pixel map and alters the map by placing a reduced pixel density black band 38 between the black pixels 32" and other color pixels 34". This reduces black bleed but has the image corrupting side effect of creating a visible band of gray adjacent to the color area.

Yet another approach of the prior art is to replace all the black ink on the page with either reduced pixel density black or with a CMY pixel mix which, as explained previously, can produce a less dense black. While this creates an image without apparent halos or bands, the lack of true black, especially in any text on the image, is noticeable and reduces the contrast and resolution of the image.

SUMMARY OF THE INVENTION

The present invention teaches a color printing system and method with reduced bleed. More specifically, the color printing system includes a computer having a digital processor and memory, and a color printer coupled to the computer. A document is stored in the memory of the computer that includes a pixel map and corresponding information regarding the nature of the objects in the document. Implemented on the computer is an image processor. The image processor adjusts the pixel map utilizing the available information regarding the nature of the objects in the document to produce a printable pixel map where the black pixel densities of only selected objects are reduced. More specifically, this printable pixel map, is used to produce a printed image with reduced black pixel density only in the graphic objects, i.e. text and picture objects are unaffected. This is because bleed is not typically a problem in text and picture objects, and unnecessarily reducing the black pixel density of such objects reduces contrast and therefore image clarity.

Graphic objects are defined as those printable objects where bleed can be a problem and reduced black pixel density is not detrimental or as detrimental as in non-graphic objects. Some typical graphic objects include squares, rectangles, circles, and lines. As mentioned previously, non-graphic objects are typically objects such as pictures and text. This invention therefore differs from other methods of reducing black bleed by using information regarding the nature of the objects and reducing black pixel density of objects selectively. This is accomplished by analyzing the objects before they are rendered into a pixel map for printing. As noted above, all prior art methods analyze the pixel map itself, and therefore do not have access to information concerning object type when trying to minimize bleed.

In the preferred embodiment, the criteria for selecting objects for reduction of black pixel density is limited to business graphics (e.g. graphs, pie charts, etc.) as graphic objects. Business graphics typically include a color picture within a black border and therefore are highly subject to bleed. Objects which are not well suited for reduction of black pixel density include text, digitized photographs, and pictorial images. Text objects are most readable when the you have the greatest contrast between the text and the background and, thus, it is preferred not to reduce the black pixel density of text. Since digitized photographs are typically "screened", i.e. the dots are separated on the page, they are not particularly subject to bleed. In fact, with a photographic object the printed image may actually improve from a small amount of bleed. Therefore, it is preferred not to reduce the black pixel density of photographs since bleed is not a problem and since it is generally desirable to keep the contrast high.

In some images, the pixel map contains only monochrome information, i.e. the printout will be black and white. In black and white printouts bleed is not a problem and it would be ideal to maintain full black pixel density throughout the entire image. The present invention therefore analyzes whether any of the objects on the page of the document to be printed contain color. If color does not occur anywhere on a page, then when printing, the black pixels can be printed at maximum density, since bleed will not be a problem.

These and other advantages of the present invention will become apparent upon reading the following detailed descriptions and studying the various figures of the drawings.

BRIEF DESCRIPTION OF THE DRAWINGS

FIG. 1 is a color printing system of the prior art;

FIG. 2a illustrates a bleeding problem with color printers of the prior art;

FIG. 2b illustrates a first prior art solution to the bleeding problem;

FIG. 2c illustrates a second prior art solution to the bleeding problem;

FIG. 2d illustrates a third prior art solution to the bleeding problem;

FIG. 4 is a flow diagram of a method for reducing bleed in a color printing system in accordance with this invention;

DETAILED DESCRIPTION OF THE PREFERRED EMBODIMENTS

Figure 3:
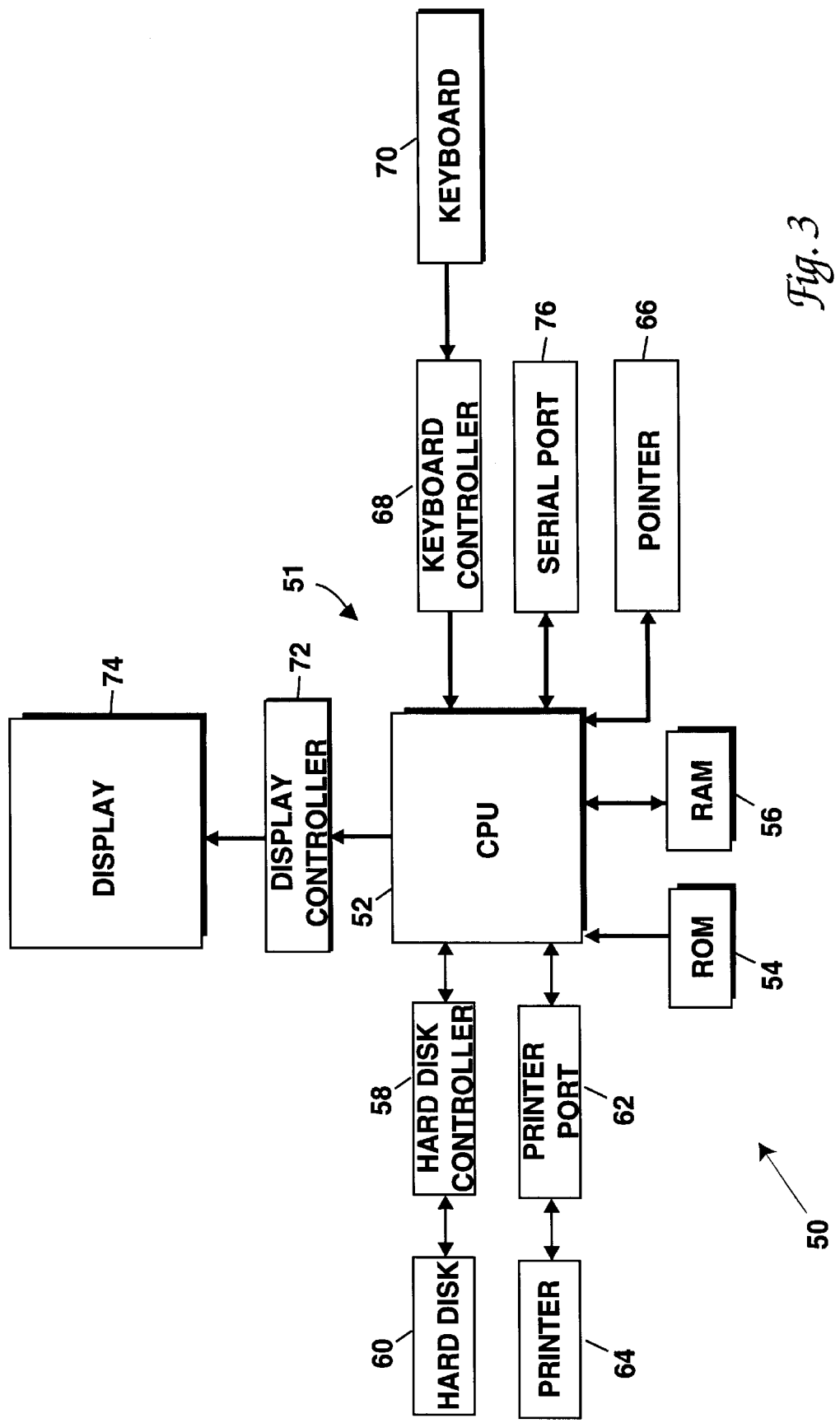
FIG. 3 is a block diagram of a color printing system in accordance with the present invention.

FIGS. 1 and 2a–2d illustrate the prior art. In FIG. 3, a color printing system 50 in accordance with the present invention includes a computer portion 51 including a central processing unit (CPU) 52, read only memory (ROM) 54, and random access memory (RAM) 56. The computer portion 51 may also optionally include a hard disk controller 58, a hard disk 60, a parallel input/output (I/O) port 62, a pointing device 66, a keyboard controller 68, a keyboard 70, display controller 72, a display 74, and a serial I/O port 76.

CPU 52, ROM 54, and RAM 56 are preferably commercially available integrated circuits ("chips") available from a variety of sources. CPU 52 is preferably a single chip digital processor. ROM 54 contains the basic operating system instructions for the computer portion 51 of the color printing system, and RAM 56 is used for temporary ("scratch pad") memory.

The color printing system 50 further includes a color printer 64 coupled to the computer portion 51. The preferred color printer is a color ink jet printer that uses cyan, magenta, yellow, and black (CMYK) inks to provide images on a page of paper. In CMYK space, the three colors and black are subtractive. The more cyan, magenta, or yellow added, the closer the color in the image is to black. This model is well suited for printing on white paper. To achieve a white pixel, no ink is printed on the page at the location of that pixel. To achieve darker pixels, more ink is provided to the page. In theory, black pixels can be made by mixing full density cyan, magenta, and yellow pixels, but limitations in ink technologies makes this solution unattractive. Therefore, black ink is preferably used to make black pixels. As the CMYK color model is the standard for color ink jet printers, this type of printer is readily commercially available from a number of sources.

The color printing system includes a display controller 72 and a display 74. The display 74 preferably uses red, green, and blue (RGB) phosphors and is based on the RGB color model to display images corresponding to an electronic document. A typical display 74 is a cathode ray tube (CRT) display. Another type of display is the flat panel display, which often uses liquid crystal display (LCD) technology. In RGB space, the three colors are additive. The more of each color added, the closer the color in the image is to white. This corresponds to the way that CRT displays work: saturating the red, green, and blue phosphors of a color display produces white, while turning the three phosphors completely off produces black. As the RGB color model is the standard for color displays, this type of display is readily available.

It should be noted that computer displays, such as display 14 of FIG. 1 and 74 of FIG. 3, and printers, such as printer 16 of FIG. 1 and printer 64 of FIG. 3, are examples of "raster" type output devices. By "raster", it is meant herein that images are produced by an x–y matrix of pixels, and not that the images are produced by any particular scanning method. Numerous types of visual output devices for computer are raster type devices. However, some visual output devices, such as plotters, are vector type devices.

In another embodiment, the display 74 is based on the hue, saturation, and brightness (HSV) color model, which defines an HSV space. This model is not based on three primary colors, but rather separates hue and color, from brightness and saturation. In the HSV model brightness is a measure of the amount of black in a color, saturation is a measure of how much white the color contains, and hue is an arbitrary assignment of numbers to colors.

A pointer 66 and a keyboard 70 are generally desirable for a user to interface with the color printing system. It is of course possible for a user to interface through a network port, or display 74 could be a dual-purpose I/O screen.

A flow diagram of a process 79 for creating and printing a color image with reduced black bleed from a document is shown in FIG. 4. This method is preferably implemented on the computer 51 as a software driver.

In the color printing system 50 the term "image" is often used to refer to a viewable image, i.e. an image as it is displayed on a display or printed on a page. The minimum information required to produce the image is typically stored in an image pixel map. That is, all information concerning a particular pixel (intensity, color, etc.) is stored in a memory to "map" the information to that particular pixel. Other information available in the computer is information concerning the "objects" (e.g. text, graphic, and picture objects) of a document which are used to ultimately create the image. As used herein, a "document" or "electronic document" will refer to information stored in some form of memory of the computer including the pixel map information and information concerning the type of objects corresponding to the image.

Figure 4A:
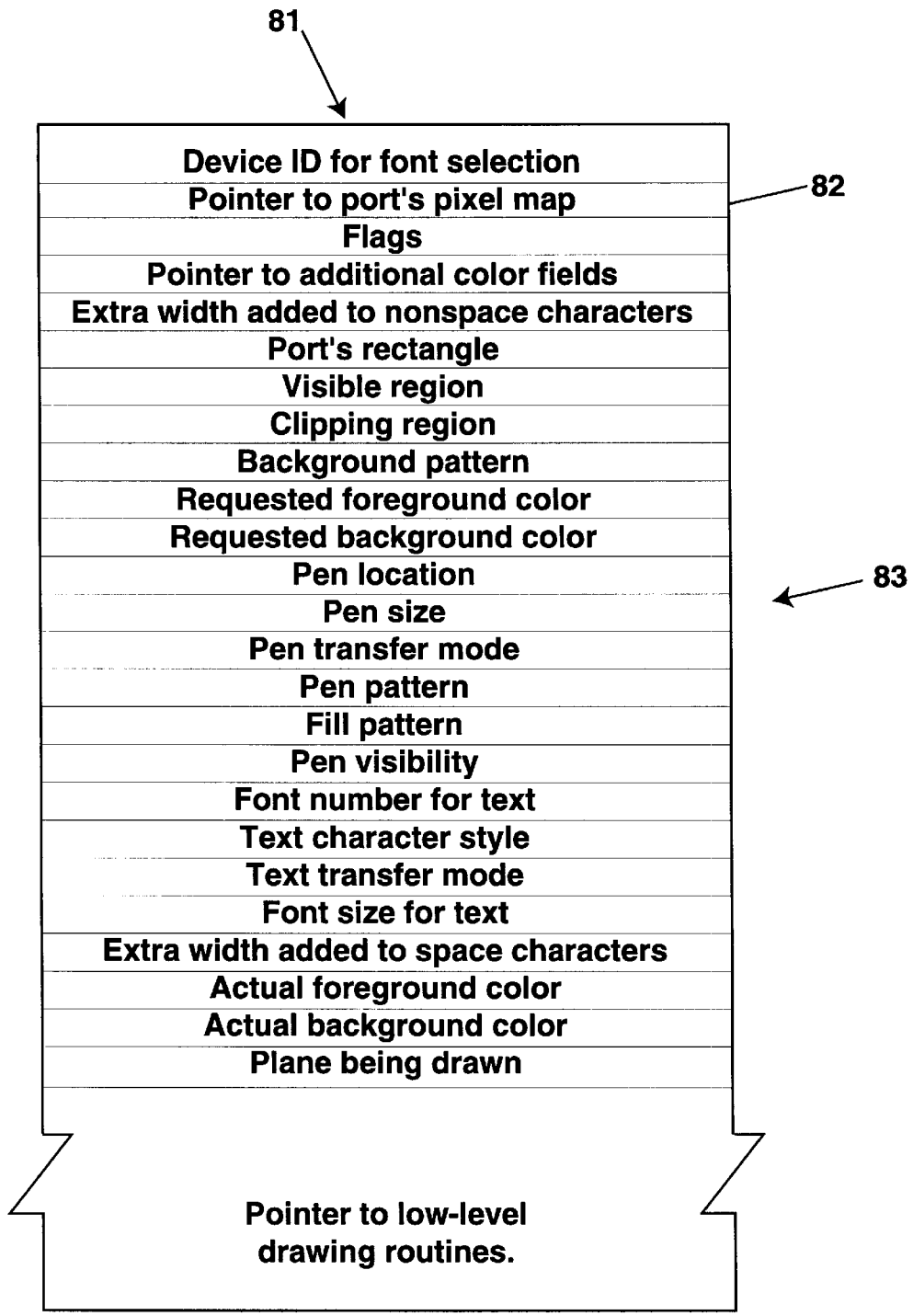
FIG. 4a illustrates the record field layout of a GrafPort.

The preferred format of a document for the present invention is a "GrafPort" 81, as is illustrated in FIG. 4a. The GrafPort contains the information needed to maintain a color image in a computer system. Note that the GrafPort 81 contains a pointer 82 to the port's pixel map along with other information 83 regarding the color image. The GrafPort and its use is described in more detail in the standard reference Inside Macintosh, Volume VI, pp 16-1 through 16-22.

A pixel map can best be described by starting with a description of the most basic type of pixel map, the bit map. A bit is a unit which can have a value of either 0 or 1. A standard method for storing a black and white image is to digitize the image and place it into an x–y array of bits called a bit map which correspond to the x–y arrangement of pixels on a raster output device. For a printer, a bit having a value of 0 may correspond to white, and a bit having a value of one would then correspond to black. This method corresponds intuitively to a black and white display on either a printer or a monitor. The concept of a bit map can be expanded into a pixel map for a gray scale or color image. A pixel is the basic unit of a gray scale or color image (collectively "color image") and is usually a number of integer values which define various parameters of the pixel. Depending on the desired resolution and the memory capabilities, the allowable integer size could be four bit, eight bit, sixteen bit, or larger.

Figure 4B:
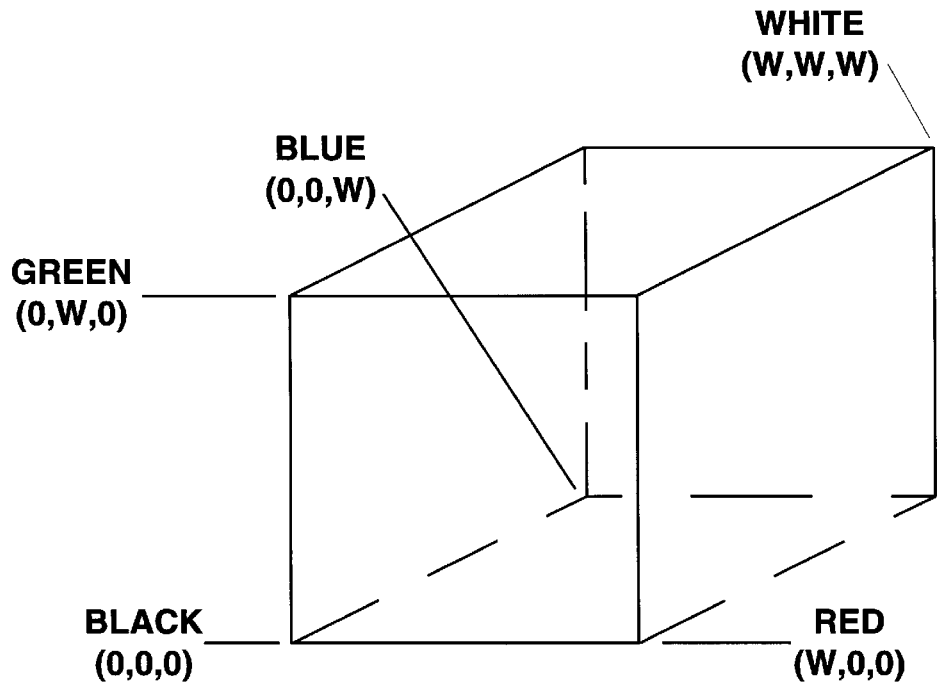
FIG. 4b is an illustration of RGB space.

In the preferred embodiment, the image document contains an RGB pixel map. Each pixel will have three unique integer values, one for each of the colors RGB. This is called a direct pixel map. For the display, the integer value corresponds to the pixel density. The larger the integer value, the greater the pixel intensity. Here the preferred pixel resolution is two byte, so our integer values can range from RGB=[0, 0, 0], which corresponds to K, up to RGB=[65, 535, 65,535, 65,535], which corresponds to W. As is well known to those skilled in the art, the RGB color spectrum can be thought of as a cube in three dimensional RGB space, as illustrated in FIG. 4b. In the CMYK color model used for the printable pixel map, each pixel will have four unique integer values, one for each of the colors CMYK. For the color printer, the density levels correspond to the darkness of the CMYK colors in the printout. As used herein, a "printable pixel map" will refer to a "CMYK" or other printer model based pixel map.

In another embodiment, the pixel is a single integer. In a one byte embodiment, each pixel integer value would range from 0 to 255. Each integer value serves as an index in a table containing predetermined RGB color combination. This is called a index table map.

An important concept of this invention is to process the image before rendering the CMYK pixel map. This is because once the CMYK pixel map is rendered there is a loss of information regarding the nature of the objects in the image. That is, a CMYK pixel map does not include object information. Since we are processing the RGB pixel map, which lies in RGB space, but printing in CMYK space, it is useful to describe in some detail the relationship between these two color models. The spectrum of visible colors can be described as covering a continuum from black (K) to white (W), as illustrated for RGB space in FIG. 4c. Utilizing three primary colors, such as RGB or CMY, it is possible to display all of the colors in this spectrum by simply adjusting the color densities. Under the principle of compliment colors, it is possible to transform from one color space to another. The following formulas define the transformation from RGB space to CMY space:

$$C = W - R$$

$$M = W - G;$$

$$Y = W - B$$

Figure 4C:
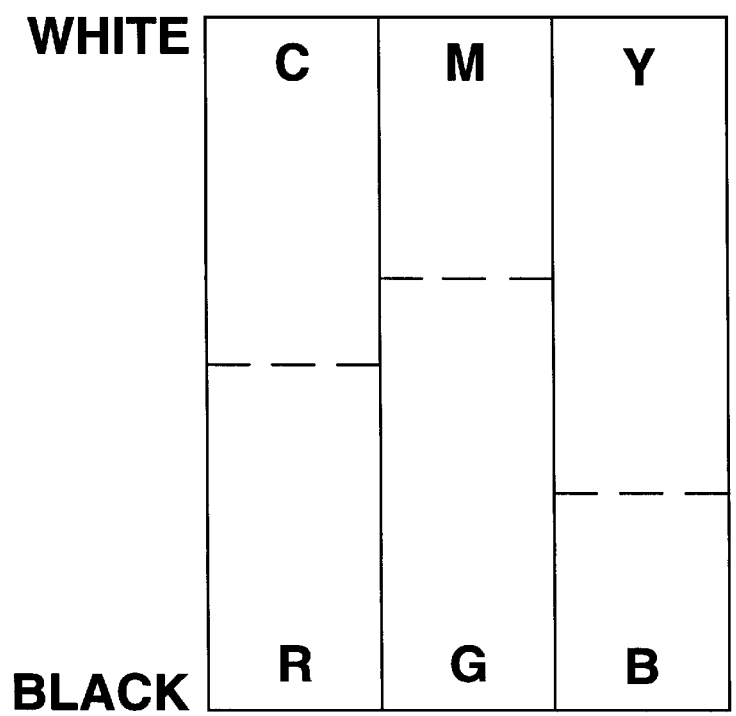
FIG. 4c is an illustration of the relation between the color models RGB and CMY.

This relationship is demonstrated graphically in FIG. 4c.

As discussed above, a color printer typically operates in CMYK, not CMY, space. Since K is accomplished with a combination of CMY in the CMY color model, the process must reduce the density of CMY and create a CMYK pixel map. This is accomplished using the following relationships:

$$K = f(C, M, Y)$$

$$C' = C - f_1(K)$$

$$M' = M - f_2(K)$$

$$Y' = Y - f_3(K)$$

Where f(C,M,Y) is a defined function of CMY, and $f_1(K)$, $f_2(K)$, $f_3(K)$ are defined functions of K. In our preferred embodiment:

$$f(C,M,Y) = \text{MIN } \{C,M,Y\}$$

$$f_1(K) = f_2(K) = f_3(K) = K$$

So a CMYK pixel map can be created from a CMY pixel map using the following relationships:

$$K = \text{MIN } \{C,M,Y\}$$

$$C' = C - K$$

$$M' = M - K$$

$$Y' = Y - K$$

The process of FIG. 4 begins in step 80 by providing a document which may include graphics, pictures, and text. These documents can be produced by a variety of application programs, as is well known to those skilled in the art. For example, Microsoft Word, Lotus 123, Pagemaker, etc. are all capable of producing electronic documents. In a second step 84, the process receives and identifies graphic objects, reduces black pixel density, and develops a printable pixel map of the document with printer control commands. Herein, the process of step 84 as implemented in software on the computer system performs the function of an "image processor." In other words, process step 84 when implemented as a software driver running on a computer 51 causes the computer 51 to become an image processor. This step is 84 discussed in more detail with reference to FIG. 5. In a final step 86, the process prints the document image using the printable pixel map.

Figure 5:
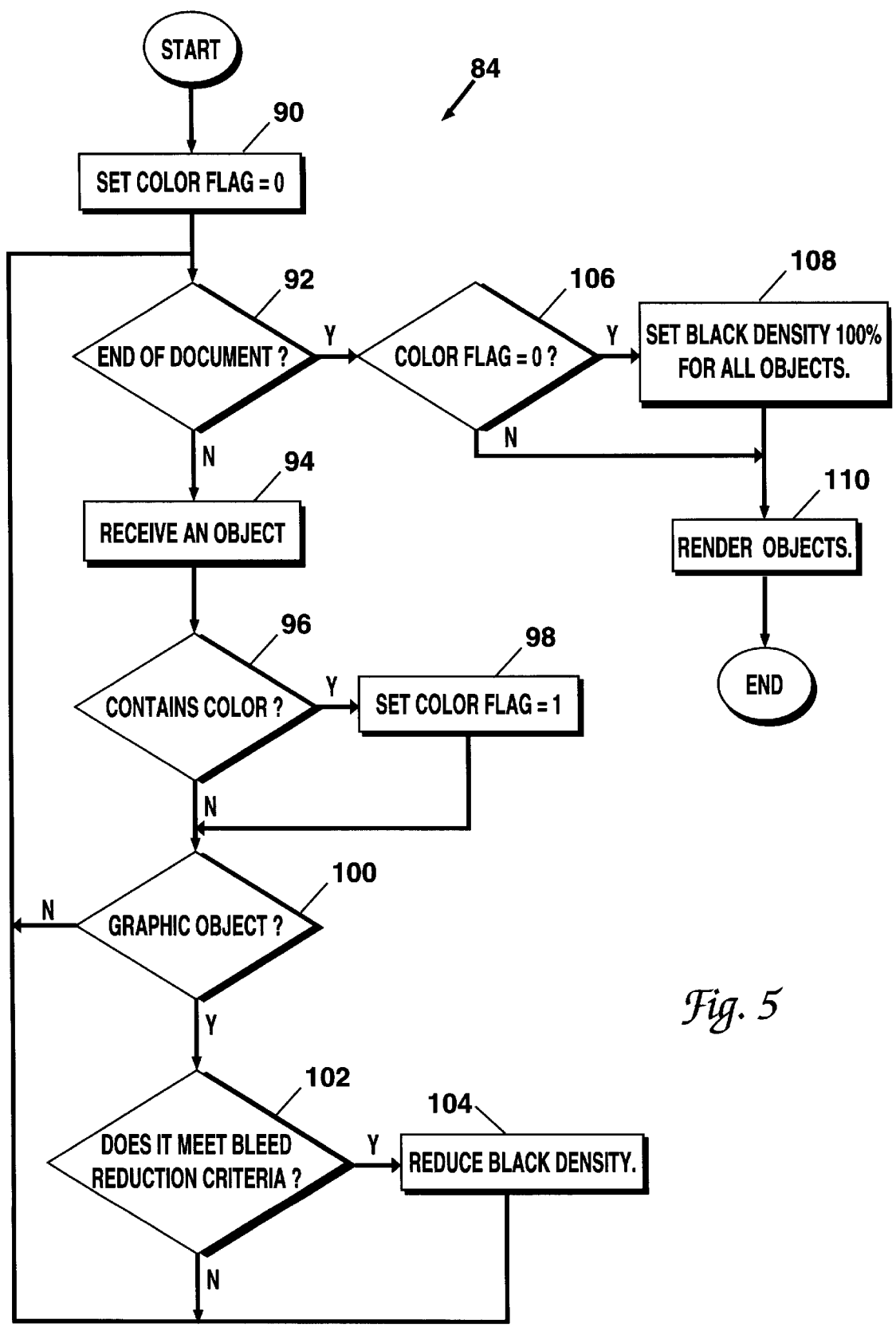
FIG. 5 is a flow diagram of step 84 of FIG. 4.

Step 84 of FIG. 4 is illustrated in greater detail in FIG. 5. The process 84 begins with step 90 by setting the variable COLORFLAG to 0. The variable COLORFLAG will be used latter by the image processor in rendering the image.

A step 92 determines whether the end of the document has been reached. That is, step 92 determines whether all of the objects in the document have been received and processed by the image processor. If the end of the document has not been reached, the image processor retrieves the next object in a step 94. It is important to note here that when the image processor receives the object, it receives information concerning the type of the object.

In step 96, the image processor determines if the object just received contains a color other than black. Of course, black is not considered to be a color in the technical sense, but as used herein "black" will be referred to as a color. If the object does not contain a color other than black, the process proceeds to step 100. If the object does contain a color other than black, the process proceeds with step 98 where it assigns the value 1 to COLORFLAG and then to step 100 where the process determines if the object is a graphic object. If it is not a graphic object, the process returns to step 92, and if it is a graphic object the process proceeds to step 102. In step 102 it is determined if the object meets the bleed reduction criteria. If the object does not meet bleed reduction criteria, the process returns to step 92. If the object does meet the bleed criteria then the process proceeds to step 104 where it reduces the black density and then returns to step 92. In the preferred embodiment, the bleed reduction criteria depends on paper color, paper type, and the user selectable print mode. If the paper used for printing is not standard white paper (e.g. is a coated paper or a colored paper) then bleed is not considered to be a problem in the present invention, hence no reduction in the black density is desired.

After step 92 determines that the end of the document has been reached the process proceeds to step 106. In step 106 it is determined whether COLORFLAG has a value of 0. If COLORFLAG is not 0, the process proceeds to step 110. If the COLORFLAG is 0, the process proceeds to step 108. In step 108 black density is set to one-hundred percent for all objects and then the process proceeds to step 110. This is because no object on the page included color, and therefore black can be printed at full density without bleed problems. In step 110 the image processor renders a printable pixel map and then returns control to step 86 of FIG. 4. The process of step 110 is well known to those skilled in the art of printer drivers.

Figure 6:
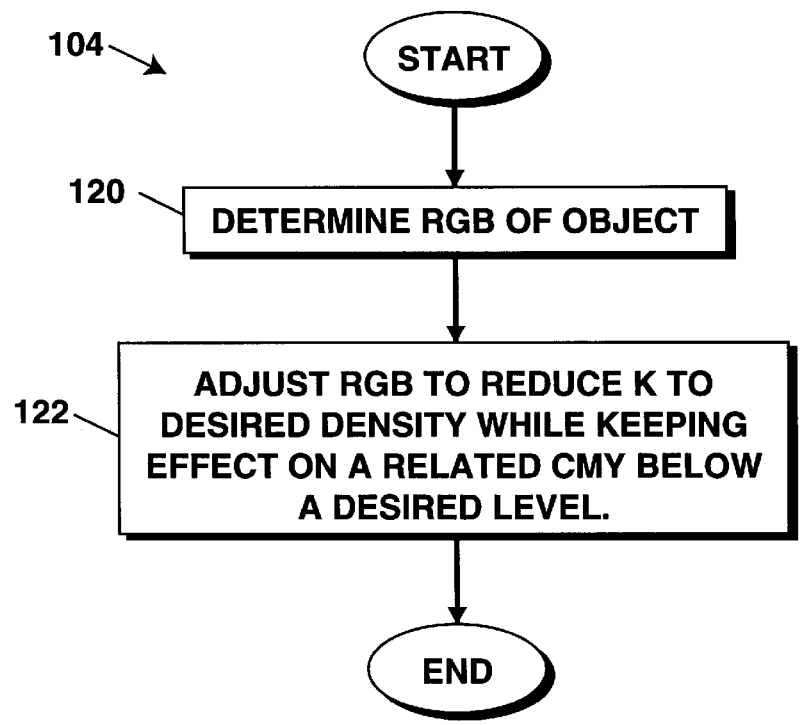
FIG. 6 is a flow diagram of step 104 of FIG. 5.

In FIG. 6 step 104 of FIG. 5 is shown in more detail. In step 120, the image processor determines the RGB pixel density of the object. In order to take advantage of the available information regarding the nature of the objects in the image, the RGB pixel map is processed. Since printing is done in CMYK space, the RGB pixel density is adjusted such that the K pixel density is decreased in the corresponding printable CMYK pixel map. In order to begin doing this the factor DENSITY is defined as the black pixel density reduction factor. DENSITY is an integer in the range of 0 to 100. W, which is white or the saturation level, would be 65,535, and the adjustment factor MINCOLOR is found as follows:

$$\text{MAXCOLOR} = \text{MAX}\{R,G,B\}$$

$$\text{MINCOLOR} = ([W - \text{MAXCOLOR}] \times \text{DENSITY})/100$$

The divisor of 100 is a scaling factor to guarantee an appropriate integer value in the range of 0–65,535. Then the adjusted pixel densities R'G'B' can be calculated as:

$$R' = R + \text{MINCOLOR}$$

$$G' = G + \text{MINCOLOR}$$

$$B' = B + \text{MINCOLOR}$$

Figure 6A:
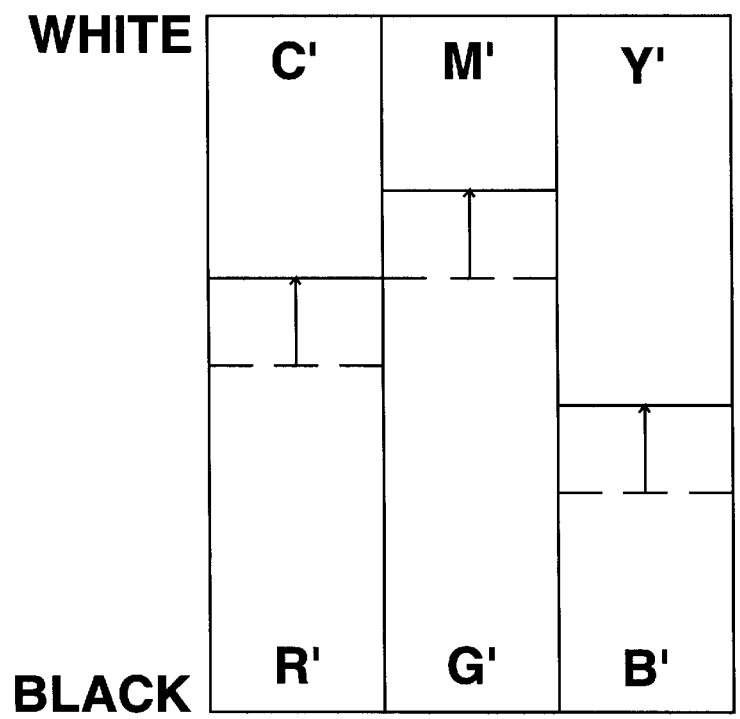
FIG. 6a is an illustration of step 122 of FIG. 6.

Adding the factor MINCOLOR to each value of RGB will reduce K in the CMYK pixel map to the desired density while keeping the effect on a CMY below a desired level, allowing saturated colors to remain fully saturated. This adjustment is illustrated in FIG. 6a.

It will therefore be apparent from the forgoing discussions that bleed is reduced in a fashion that does not require special papers and that minimizes printed image degradation. This is accomplished by analyzing the image in RGB space before it is rendered to CMYK space where information concerning object type is lost. The RGB information is modified such that the K in CMYK space is reduced for only graphic objects (thereby reducing bleed where it is needed), but only if at least one object on the page includes color and only if ordinary paper is used. Bleed is therefore reduced without substantial side-effects and at virtually no additional system cost.

While this invention has been described in terms of several preferred embodiments, there are alterations, permutations, and equivalents which fall within the scope of this invention. It should also be noted that there are many alternative ways of implementing both the process and apparatus of the present invention. It is therefore intended that the following appended claims be interpreted as including all such alterations, permutations, and equivalents as fall within the true spirit and scope of the present invention.

What is claimed is:

1. A color printing system with reduced bleed comprising:
   a computer including a central processing unit and memory accessed by said central processing unit, said memory including an image stored according to a first color model, said image having printable objects selected from the group comprising graphic objects and non-graphic objects and a first color model pixel map corresponding to said image;
   a printer coupled to said computer capable of printing pixel maps using a second color model; and
   an image processor implemented on said computer that receives said image, identifies said graphic objects among said printable objects, and adjusts said first color model pixel map such that portions of a second color model pixel map subsequently rendered from said image corresponding to said graphic objects have reduced black pixel density while black pixel densities of portions of said second color model pixel map corresponding to said non-graphic objects are not reduced.

2. A color printing system as recited in claim 1 further comprising an input device coupled to said computer to provide document information including said printable objects to be stored in said memory.

3. A color printing system as recited in claim 1 wherein said second color model is a cyan, magenta, yellow, and black (CMYK) color model, and said printer is capable of printing CMYK pixels as specified by CMYK pixel densities in said second color model pixel map.

4. A color printing system as recited in claim 3 wherein said first color model is a red, green, blue (RGB) color model.

5. A color printing system as recited in claim 4 wherein said image processor converts said RGB pixel densities of said printable objects to CMYK pixel densities of said pixel maps.

6. A color printing system as recited in claim 5 wherein said RGB pixel densities of said graphic objects are adjusted to reduce black pixel density in said CMYK pixel densities of said pixel maps.

7. A color processing system comprising:
   a central processing unit;
   memory accessed by said central processing unit;
   an input port coupled to at least one of said central processing unit and said memory by which an image stored according to a red, green, blue (RGB) color model can be entered into said memory, said displayable image including an RGB pixel map and printable objects being selected from the group consisting essentially of graphic objects and non-graphic objects; and
   an image processor implemented on said central processing unit that receives said image, identifies said graphic objects among said printable objects and adjusts said RGB pixel map such that portions of a subsequently rendered cyan, magenta, yellow, and black (CMYK) pixel map of said printable objects corresponding to said graphic objects have reduced black pixel density.

8. A color processing system as recited in claim 7 wherein said image processor does not reduce black pixel density of said non-graphic objects.

9. A color processing system as recited in claim 8 wherein said image processor further produces said subsequently rendered CMYK pixel map.

10. A color processing system as recited in claim 9 further comprising an output port coupled to at least one of said central processing unit and said memory to provide said CMYK pixel maps to a color printer.

11. A color processing system as recited in claim 10 further comprising an input port coupled to said at least one of said central processing unit and said memory to provide document information including said printable objects to be stored in said memory.

12. A method for processing printable objects to reduce bleed in a printed image comprising the steps of:
   providing an electronic document including printable objects, the electronic document being represented by a first color model pixel map, and the printable objects including graphic objects and non graphic objects;
   identifying graphic objects among said printable objects of the electronic document;
   adjusting color information of said graphic objects within the first color model pixel map if bleed reduction criteria are met; and
   after said adjusting, developing printer control information for the electronic document in a second color model pixel map,
   wherein due to the adjustment of said color information of said graphic objects, black pixel density is lowered for those of said printable objects in the electronic document that correspond to said graphic objects while black pixel density is not adjusted for those of said printable objects in the electronic document that do not correspond to said graphic objects.

13. A method as recited in claim 12 wherein color information of non-graphic objects among said printable objects is not adjusted.

14. A method as recited in claim 12 wherein said graphic objects contain color information comprising red, green, and blue pixel densities, and wherein said step of adjusting color information includes adjusting said red, green, and blue (RGB) pixel densities of said graphic objects, and wherein said step of developing printer control information includes converting said RGB pixels of said printable objects into cyan, yellow, magenta, and black (CMYK) pixel density information.

15. A method as recited in claim 14 wherein said graphic object comprises a plurality of color regions each including a red, green, and a blue pixel, and wherein said step of adjusting color information comprises, for each color region:
   determining the maximum intensity value of the intensities of said red, green, and blue pixels;
   calculating an adjustment value from said maximum intensity value, a saturation level value for said pixels, and a black reduction value; and
   adjusting said intensities of said red, green, and blue pixels using said adjustment value.

16. A method as recited in claim 15 wherein said step of calculating an adjustment value MinColor includes, for a maximum intensity value MaxColor, a saturation level SaturationLevel, and a black reduction value Density uses the following relationship:

$$\text{MinColor} = \{(\text{SaturationLevel} - \text{MaxColor}) \times \text{Density}\}/100.$$

17. A method as recited in claim 16 wherein said step of adjusting said intensities uses the following relationships:

$$R' = R + \text{MinColor}$$

$$G' = G + \text{MinColor}$$

$$B' = B + \text{MinColor}$$

where R, G, and B are the intensity levels of said red, green, and blue pixels prior to adjustment, and R', G', and B' are the intensity levels of said red, green, and blue pixels after adjustment.

18. A method as recited in claim 17 wherein said step of developing printer control information comprises the step of converting said color information of said graphic objects into pixel maps including cyan, yellow, magenta, and black (CMYK) pixel information.

19. A method as recited in claim 18 wherein said step of converting said color information utilizes the following relationships:

$$C = W - R$$

$$M = W - G$$

$$Y = W - B$$

$$K = \text{MIN}\{C, M, Y\}$$

where W is a white level.

20. A method as recited in claim 12 further comprising the steps of:

determining whether any graphical object among said printable objects includes color information; and not reducing said black pixel density in said printer control information if no graphical object among said printable objects includes said color information.

21. A method for processing printable objects to reduce bleed in a printed image comprising:

providing an electronic document including printable objects;

identifying graphic objects among said printable objects, each of said graphic objects containing color information comprising red, green, and blue (RGB) pixel densities in that said graphic objects comprise a plurality of color regions each including a red, a green, and a blue pixel;

adjusting said RGB pixel densities of said graphic objects if bleed reduction criteria are met, said adjusting including, for each color region:

determining the maximum intensity value of the intensities of said red, green, and blue pixels;

calculating an adjustment value from said maximum intensity value, a saturation level value for said pixels, and a black reduction value; and adjusting said intensities of said red, green, and blue pixels using said adjustment value; and thereafter, developing printer control information from said printable objects that can provide for a lower black pixel density for pixel maps corresponding to said graphic objects due to the adjustment of said color information of said graphic objects, said developing including converting said RGB pixels of said printable objects into pixel density information corresponding to a color model suitable for printing.

22. A method for processing printable objects to reduce bleed in a printed image comprising:

providing an electronic document including printable objects;

identifying graphic objects among said printable objects, said graphic objects containing color information comprising red, green, and blue (RGB) pixel densities;

adjusting said RGB pixel densities of said graphic objects if bleed reduction criteria are met; and thereafter, developing printer control information from said printable objects that can provide for a lower black pixel density for pixel maps corresponding to said graphic objects due to the adjustment of said color information of said graphic objects, said developing including converting said RGB pixels of said printable objects into cyan, yellow, magenta, and black (CMYK) pixel density information.

23. A method for processing printable objects to reduce bleed in a printed image comprising:

providing an electronic document including printable objects;

identifying graphic objects among said printable objects, said graphic objects containing color information in accordance with a hue, saturation, and brightness (HSV) color model in that said graphic objects comprise a plurality of color regions having a corresponding plurality of HSV values;

adjusting said color information of said graphics objects if bleed reduction criteria are met, including adjusting said plurality of HSV values of said graphic objects; and thereafter, developing printer control information from said printable objects that can provide for a lower black pixel density for pixel maps corresponding to said graphic objects due to the adjustment of said color information of said graphic objects, said development including converting said adjusted plurality of HSV values of said graphic objects into cyan, yellow, magenta, and black (CMYK) pixel density information.

* * * * *